United States Patent [19]

Tominaga et al.

[11] Patent Number: 5,237,208

[45] Date of Patent: Aug. 17, 1993

[54] APPARATUS FOR PARALLEL OPERATION OF TRIPORT UNINTERRUPTABLE POWER SOURCE DEVICES

[75] Inventors: Fukutoshi Tominaga, Fukuoka; Yasuhiro Kawata; Hidehiro Koike, both of Saga, all of Japan

[73] Assignee: Nishimu Electronics Industries Co., Ltd., Japan

[21] Appl. No.: 772,596

[22] Filed: Oct. 7, 1991

Related U.S. Application Data

[63] Continuation of Ser. No. 423,783, Oct. 18, 1989, abandoned.

[30] Foreign Application Priority Data

Oct. 25, 1988 [JP] Japan ................................ 63-269227

[51] Int. Cl.$^5$ .......................... H02J 7/00; H02J 9/00
[52] U.S. Cl. ........................................ 307/66; 307/43; 307/87
[58] Field of Search ................. 307/43, 52, 53, 57, 307/58, 64–66, 82–87; 323/307

[56] References Cited

U.S. PATENT DOCUMENTS

| | | | |
|---|---|---|---|
| 3,703,644 | 11/1972 | Thorberg | 307/87 X |
| 3,710,133 | 1/1973 | Ferraro | 307/87 X |
| 3,823,327 | 7/1974 | Bayer | 307/87 X |
| 3,908,132 | 9/1975 | Krampe et al. | 307/87 |
| 3,999,077 | 12/1976 | Borkovitz et al. | 307/66 |
| 4,010,381 | 3/1977 | Fickenscher et al. | 307/66 |
| 4,171,517 | 10/1979 | Higa et al. | 328/72 |
| 4,238,690 | 12/1980 | Clarke | 307/44 |
| 4,251,735 | 2/1981 | Coleman | 307/66 X |
| 4,328,429 | 5/1982 | Kublick | 307/87 X |
| 4,405,867 | 9/1983 | Moakler et al. | 307/87 X |
| 4,527,080 | 7/1985 | Zweig | 307/87 X |
| 4,539,487 | 9/1985 | Ishii | 307/44 |
| 4,556,802 | 12/1985 | Harada et al. | 307/66 |
| 4,609,828 | 9/1986 | Small | 307/64 X |
| 4,677,309 | 6/1987 | Ogawa | 307/66 |
| 4,733,341 | 3/1988 | Miyazawa | 307/82 X |
| 4,862,059 | 8/1989 | Tominaga et al. | 307/66 |
| 4,893,069 | 1/1990 | Harada et al. | 323/307 X |
| 4,956,563 | 9/1990 | Schornack | 307/87 X |

OTHER PUBLICATIONS

R. Rando, "AC Triport-A New Uninterruptible AC Power Suuply", Intelec Proceedings, Oct., 1978.
"On the Parallel Operations of Triport UPS Systems," K. Harada et al, *Proceedings of Seventh International Telecommunications Conference*, Oct. 14–17, 1985, pp. 111–116.

*Primary Examiner*—A. D. Pellinen
*Assistant Examiner*—Fritz M. Fleming
*Attorney, Agent, or Firm*—Kinney & Lange

[57] ABSTRACT

In an apparatus for parallel operation of plural uninterruptable power source devices, each power source device includes at least one of an operation mode monitor for a logic operation on the output of the AC input monitoring circuit of each of the uninterruptable power source devices to feed the result thereof as a mode controlling signal to the mode controller, a parallel synchronizing signal generator for a logic operation on the output of an oscillating circuit which drives the invertor in each of the uninterruptable power source devices and, on detection of abnormality in the AC input, feeds the result thereof as a trigger pulse to the oscillating circuit, and a synchronization monitor for a logic operation on the output from the oscillating circuit in each of the uninterruptable power source devices and, when the differences between the phase of the output from the oscillating circuit of one of the triport uninterruptable power source devices and that from the oscillating circuits of remaining triport uninterruptable power source devices exceed the prescribed level, issuing a parallel operation release signal to open the switch of said one triport uninterruptable power source device that permits it to operate in parallel.

11 Claims, 4 Drawing Sheets

APPARATUS FOR PARALLEL OPERATION OF TRIPORT UNINTERRUPTABLE POWER SOURCE DEVICES

This is a continuation of application Ser. No. 07/423,783, filed Oct. 18, 1989, now abandoned.

BACKGROUND OF THE INVENTION

1. Field of the Invention

This invention relates to an apparatus for the parallel operation of a plurality of triport uninterruptable power source devices arranged in parallel connection and adapted to feed power to a load.

2. Description of the Prior Art

The widespread instance of computers and microprocessors has been of increasing importance to uninterruptable power source devices as operating power sources for such electronic devices. When the power required by a given load is so large as to surpass the capacity of one uninterruptable power source device, it becomes necessary to provide an increased magnitude of power by parallel operation of a plurality of power source devices.

In most cases, such an uninterruptable power source device for parallel operation as mentioned above is generally configured as a conventional uninterruptable power source comprising a battery driven inverter device and a commercial power source which are connected in parallel with each other, and some additional battery-driven inverter devices connected in parallel to that conventional uninterruptable power source (as reported in the treatise titled "On the Paralleling of UPS systems" by Clement Fontaine at the 1986 International Telecommunications Energy Conference, for example).

The use of such uninterruptable power source devices (hereinafter referred to briefly as "UPS") found in the prior art as described above entails the following problems.

Firstly, the burdens of load laid on the individual UPS's are desired to be proportionate to the inverter capacities of the USP's. The control necessary for proportionate load distribution is not easy to effect. In conventional UPS's, the output currents depend on the phases of inverter drive pulses and increase in proportion to the phases advance. For the purpose of proportional load distribution mentioned above, it is necessary to detect the output currents of the inverters in parallel operation and control the phases of the inverter drive pulses in accordance with the inverter capacities and the detected output currents. The circuit for this control and the method for its operation are very intricate. Thus, the control cannot be easily carried out with high reliability.

Secondly, the circulating currents which occur between the inverters of the UPS's under parallel operation when phase differences occur between the output voltages of the inverters are suppressed only with difficulty. The suppression of the circulating current may be possible to be attained by inserting a current limiting element such as a reactor in each of the inverter circuits or by detecting the circulating current and accordingly adjusting the drive timing (phase) of the inverter. In these methods, there is a problem in that the number of circuit elements required for a control is increased or the problem in that the circuit for the timing adjustment is complicated.

Thirdly, concerning the synchronous operation required for the inverters of the UPS's under parallel operation, while the conventional UPS's are controlled with high responsiveness because of their small internal inductance, they have the problem that a disruption of the synchronization among the plurality of inverters results in a very large circulating current. To cope with this problem, the synchronization among the inverters must be controlled very accurately and quickly. The circuit for realizing such accurate and quick control of the synchronization as mentioned above necessitates advanced design and complicated configuration and suffers from high cost and poor reliability.

Fourthly, when any of the UPS's under parallel operation develop trouble, it must be removed from such operation parallel as soon as possible. Since the conventional UPS has a small internal inductance as mentioned above, an accidental short circuit may possibly result in an excessive rate of increase in the short-circuit current. The preclusion of such trouble calls for early detection of the undue short-circuit current and quick removal of the UPS in trouble. The circuitry capable of fulfilling this requirement is so complicated as to entail the disadvantage of high cost and poor reliability.

BRIEF SUMMARY OF THE INVENTION

The object of this invention is to provide an apparatus for the parallel operation of a plurality of uninterruptable power source devices, which apparatus ensures complete freedom from the problems mentioned above, allows burdens of load to be easily made proportionate to the capacities of the individual UPS's (capacities of inverters and UPS transformers) without entailing complicated apparatus or degraded reliability, enables the suppression of circulating current among the inverters and the synchronous operation of the UPS's to be easily performed, and allows the removal from parallel operation of a UPS in trouble to be attained without any appreciable disturbance.

To accomplish the object described above, this invention is characterized by a configuration using, as a UPS unit, triport UPS's each comprising a commercial power source and an inverter which are connected in parallel to a triport transformer through inductance components and having a plurality of UPS units connected in parallel with each other so as to feed power to the load.

This invention is directed to an apparatus for the parallel operation of a plurality of triport uninterruptable power source devices which are adapted to be connected in parallel between an AC input power source and an output terminal, which triport uninterruptable power source devices each comprise a three-winding transformer having first, second and third windings an AC input connected to the first winding of the transformer through a first inductive component, an inverter connected to the second winding of the transformer through a second inductive component, an output terminal connected to the third winding of the transformer through a switch controlling the occurrence of parallel operation, an inverter driving means for driving the inverter in synchronization with the AC input, an AC input monitoring circuit for detecting normality or abnormality of the AC input, and a mode controlling means for controlling the switching of the inverter, in accordance with the detection output from the AC input monitoring circuit, between a standby mode in which no output current is generated by the inverter and an inverter mode in which an output current is generated. The apparatus according to the present invention is characterized to be further comprised at least one operation mode monitoring means for performing a logic operation on the detection output from the AC input monitoring circuit Of each of the triport uninterruptable power source devices and feeding the result of the logic operation as a mode controlling signal to the mode controlling means, a parallel synchronizing signal generating means for executing a logic operation on the output of the oscillating circuit in each of the triport uninterruptable power source devices adapted to be brought into parallel operation and, on detection of an abnormality in the AC input by the AC input monitoring circuit, feeding the result of the logic operation as a trigger pulse to the oscillating circuit, and a synchronization monitoring means for executing a logic operation on the output from the oscillating circuit for driving the invertor in each of the triport uninterruptable power source devices adapted to be brought into parallel operation and, when the differences between the phase of the output from the oscillating circuit of one of the triport uninterruptable power source devices and the phases of the outputs from the oscillating circuits of the remaining triport uninterruptable power source devices in parallel operation with one another exceed the prescribed level, issuing a parallel operation release signal to open the switch of said one triport uninterruptable power source device that permits its operation in parallel with the others.

The triport UPS's, by nature of their structure, are each provided with a series leakage inductance produced by a magnetic shunt of a three-winding transformer or a serially connected external series reactor. When a plurality of such triport UPS's are connected in parallel therefore, the load currents borne by the individual triport UPS's are inversely proportional to the series leakage inductance of the triport UPS's as described more specifically herein below.

When the magnitudes of the series leakage inductances or the external reactors are inversely proportional to the output capacities of the individual triport UPS's, the load current by its inherent nature is apportioned proportionately to the output capacities of the individual triport UPS's under parallel operation without requiring employment of any other means.

When a difference occurs between the output voltages of the inverters of the plurality of the triport UPS's in parallel operation with one another, a circulating current flows between the inverters. The circulating current is effectively prevented from being unduly increased because the serially connected inductances also function to suppress the circulating current.

The circulating current which is caused by a deviation of timing in the switching operation of the transistors between the inverters is limited to a relatively small value. The control of synchronization between the inverters and the control of constant output in each of the inverters do not require very high accuracy and the circuitry to be used for the control can be simplified.

Further, when the triport UPS in trouble is to be released from parallel operation with the others, then, since the series leakage inductances suppress the rate of increase of the short-circuit current during the of occurrence of a short circuit, for example, the time allowed for the detection of the short circuit or the release of the UPS in trouble from parallel operation is elongated. Thus, a device for release from parallel operation and protection of the UPS in trouble with low cost and high reliability can be easily realized. Owing to the provision of an operating mode monitoring means capable Of executing the logic operation on the detection output from the AC input monitoring circuit of each of the triport UPS's, feeding the result of said logic operation as a mode control signal to the mode control means of each of the triport UPS's, and then, on detection of a difference between one and the remaining triport UPS's in parallel operation with one another in their operating modes, issuing a parallel release signal for causing the release of the said one UPS from the parallel operation, the switching from the inverter mode to the normal mode or vice versa can be carried out by one fixed timing on all of the triport UPS's in parallel operation with one another. Thus, the inconveniences due to the difference of timing in the mode switching (occurrence of internal circulating current and instability of parallel operation) can be improved.

Owing to the provision of the parallel synchronizing signal generating means capable of executing the logic operation on the output from the inverter drive oscillating circuit of each of the triport UPS's, and, when the input monitoring circuit detects abnormality in the AC input, feeding the result of the logic operation as a trigger pulse to the oscillating circuit, the phase difference in the outputs of the inverters of the triport UPS's is substantially eliminated and the circulating current between the inverters can be suppressed to an extent of diminishing the loss.

Owing to the provision of the synchronization monitoring means capable of executing the logic operation on the output from the inverter drive oscillating circuit of each of the triport UPS's, and, when the difference between the phase of the output from the oscillating circuit of one of the triport UPS's in parallel operation with the others and the phase of the output from the inverter drive oscillating circuits of the remaining triport UPS's exceeds the prescribed value, issuing a parallel operation release signal for opening the switch of the said one triport uninterruptable power source device that permits it to operate in parallel with the others, the triport UPS which has developed an abnormality and produced a deviation of synchronization is immediately released from parallel operation and the otherwise possible propagation of the abnormality throughout the entire system can be prevented.

DETAILED DESCRIPTION OF THE INVENTION

Figure 1:
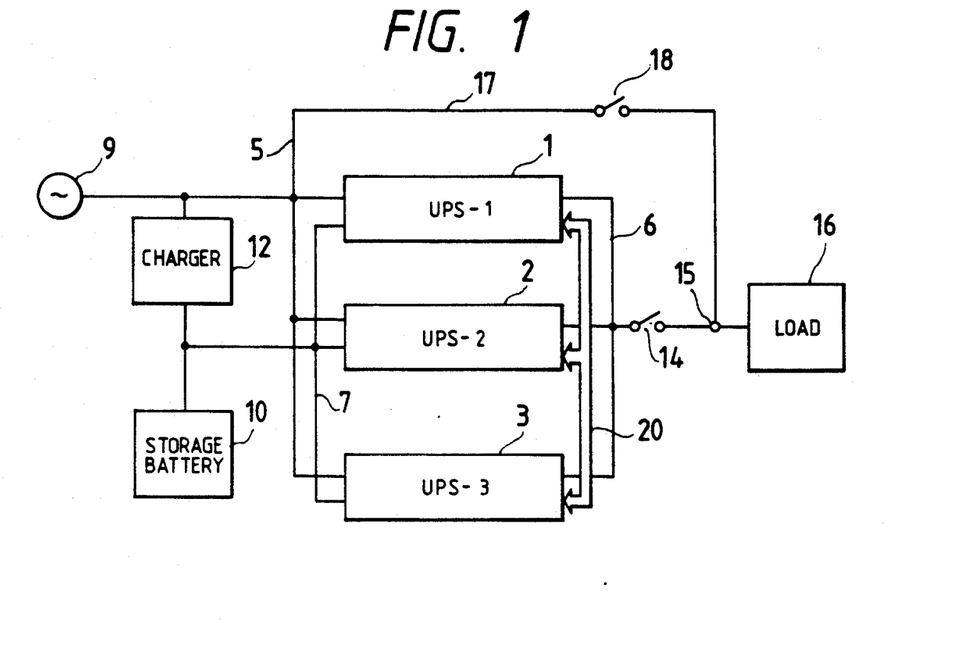
FIG. 1 is a block diagram illustrating one embodiment of this invention.

FIG. 1 is a schematic block diagram illustrating one embodiment of this invention. Though the diagram depicts three triport UPS's arranged in a parallel connection, it ought to be apparent that the number of triport UPS's to be connected in parallel can be changed at will.

The triport UPS's 1 to 3, so designated as each is based on a triport transformer, are mutually connected in parallel through an AC input bus 5, an AC output bus 6, and a DC input bus 7. The AC input bus 5 is connected to an AC commercial power source 9. The DC input bus 7 is connected to a storage battery 10 (generally a DC power source) and the storage battery 10 is charged from the commercial power source 9 through a charger 12.

The AC output bus 6 is connected to an output terminal 15 through an output breaker 14. The commercial power source 9 is connected to the output terminal 15 through a bypass line 17 and a bypass breaker 18. The three triport UPS's 1 to 3 are mutually connected through a control signal bus 20 and subjected to control of synchronization and control of mode as described specifically hereinafter.

Figure 2:
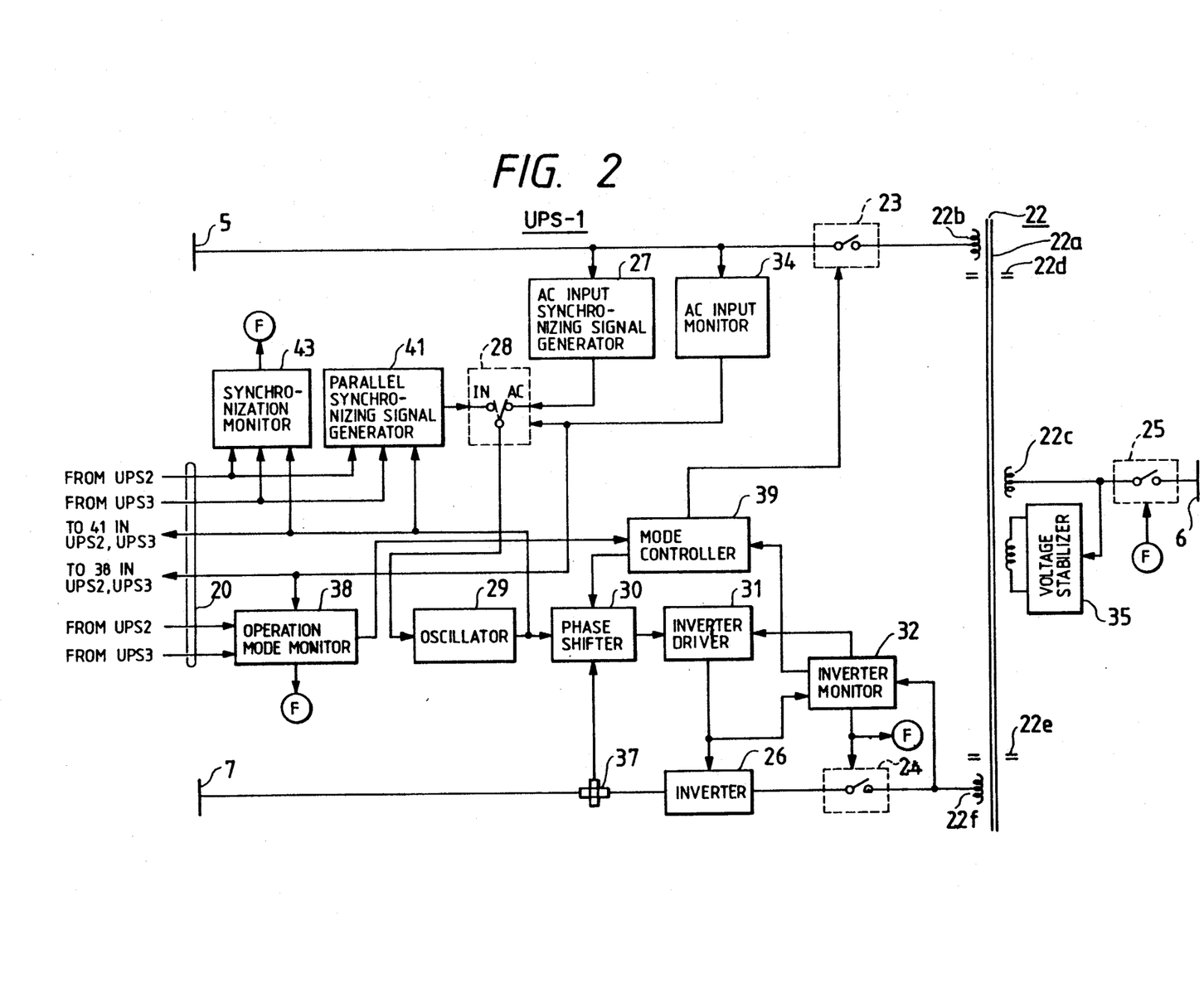
FIG. 2 is a block diagram illustrating a specific configuration of one triport UPS.

The triport UPS's 1 to 3 illustrated in FIG. 1 have one and the same structure. FIG. 2 is a block diagram illustrating a typical structure thereof.

An iron core 22a of a triport transformer 22 is divided into three sections by two magnetic shunts 22d and 22e. An AC input winding 22b, an inverter input winding 22f, and an output winding 22c are each formed in one of these sections.

The AC input winding 22b is connected to the AC input bus 5 through a line switch 23 and the inverter input winding 22f is connected to the output terminal of an inverter 26 through an inverter switch 24. The output winding 22c is connected to the AC output bus 6 through a switch 25 which selectively permits placing the UPS in an output parallel connection.

Optionally, the switches 23 to 25 may be configured with a pair of thyristors arranged in reverse parallel connection, for example. To the output side of the transformer 22, a suitable known voltage stabilizer 35 is connected. The input side of the inverter 16 is connected to the DC input bus 7 through a current detector 37.

An AC input synchronizing signal generating circuit 27 generates a trigger pulse (reset signal) synchronized to the commercial power source (particularly to the zero cross point). The synchronized trigger pulse is transferred through an AC-terminal of a changeover switch 28 to an oscillating circuit 29 and used therein to trigger the circuit.

An inverter monitoring circuit 32 compares the rectangular wave from an inverter driver 31 for driving the inverter 26 with the output wave from the inverter 26 in phase and pulse width and, when their difference exceeds a prescribed value, draws a conclusion that the inverter 26 is abnormal and issues a trouble signal F.

The trouble signal is used not only in displaying and/or warning of the abnormality of the inverter by way of an alarm, and opening the inverter switch 24 and/or bringing the operation of the inverter to a stop but also in opening the switch 25 to release the triport UPS in trouble from the parallel operation.

An AC input monitoring circuit 34 monitors the commercial power source 9 by way of a conventional method (based on possible deviation from the standard value of voltage level, cycle of frequency at the zero cross point, or voltage waveform, for example) and, on detection of an abnormality, turns the changeover switch 28 to the opposite, i.e. the IN-terminal, illustrated in the diagram.

The output from the AC input monitoring circuit 34 is simultaneously fed to an operation mode monitoring circuit 38 and to the operation mode monitoring circuits of the other triport UPS's parallel operating in with the UPS of FIG. 2 which are not shown.

The operation mode monitoring circuit 38 is supplied signals from the outputs of the AC input monitoring circuits 34 of the pertinent triport UPS and the other triport UPS's 2 and 3 with which it is in parallel operation and, on the basis of the result of the logic operation (which is described hereinafter with reference to FIG. 3) performed on these outputs of the AC input monitoring circuits, issues a mode control signal and a parallel operation release signal.

A mode controlling circuit 39, on reception of the mode control signal, controls a phase shifter 30 and, when the commercial power source or the AC input is normal, delays the phase of the inverter drive rectangular wave (the output from the oscillating circuit 29) so as to effect substantial nullification of the input current to the inverter 26 (to be detected by the current detector 37). When the AC input is abnormal, mode controlling circuit 39 advances the phase of the inverter drive rectangular wave so as to equalize it to the phase of the AC input in normal state and, at the same time, opens the line switch 23 to remove the commercial power source from the transformer 22.

A parallel synchronizing signal generating circuit 41 is supplied the rectangular wave outputs from the oscillating circuits 29 of the pertinent triport UPS and other triport UPS's 2 and 3 with which it is in parallel operation and, on the basis of the result of the logic operation (which is described in detail hereinafter with reference to FIG. 4) performed on the rectangular wave output signals, feeds a synchronizing trigger pulse to the IN terminal of the changeover switch 28.

Figure 3:
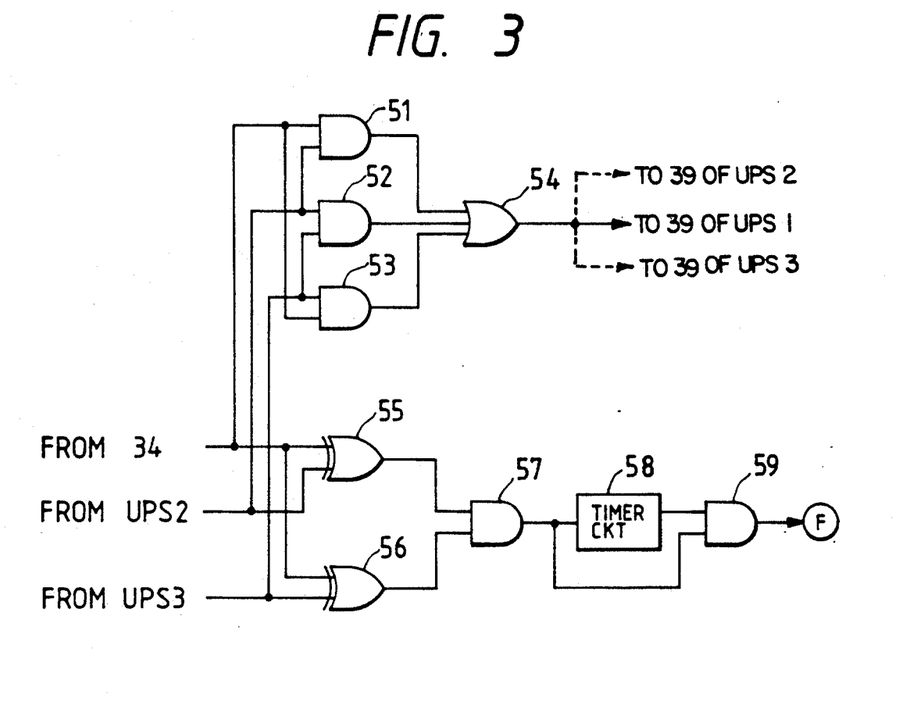
FIG. 3 is a block diagram illustrating a specific configuration of an operating mode monitoring circuit.

FIG. 3 is a block diagram illustrating a specific configuration of the operation mode monitoring circuit 38.

The detection output signal from the AC input monitoring circuit 34, and the detection output signals from the AC input monitoring circuits of the other triport UPS's 2 and 3 with which it is in parallel operation, are fed in pairs to AND circuits 51 to 53, respectively.

In the embodiment under discussion, therefore, the output "1" is produced by any of the AND circuits 51 to 53 when the detection output signals from any two of the three triport UPS's 1, 2 and 3 are both "1's". This occurs when the AC inputs in any two triport UPS's are judged as normal (generally by the rule of decision by majority) or when the AC inputs in the prescribed number "m" sets of triport UPS's among the total "n" sets are judged as normal.

Conversely, the outputs of the AND circuits 51 to 53 are invariably "0's" when the detection output signals from any two of the three triport UPS's 1, 2 and 3 are both "0's" (generally by the rule of decision by majority) or when the AC inputs in the prescribed number "p" sets of triport UPS's among the total "n" sets are judged as abnormal.

The outputs from the AND circuits 51 to 53 are applied to the mode control circuit 39 through an OR circuit 54. The resultant coincident operation mode is used as an operation mode for all of the triport UPS's 1, 2 and 3 in the parallel operation system.

The detection output signal from the AC input monitoring circuit 34 of the pertinent triport, UPS 1, is combined with the detection output signals from the AC input monitoring circuits of the other triport UPS's 2 and 3. The combined signals are fed to two-input exclusive OR circuits 55 and 56.

The exclusive OR circuits 55 and 56 produce no output when the detection output signal from the pertinent triport, UPS 1, coincides with the detection output signals from the other triport UPS's 2 and 3. When the detection output signals from the other two triport UPS's 2 and 3 coincide with each other and the detection output signal from the pertinent triport, UPS 1, differs from the other detection output signals, the two exclusive OR circuits 55 and 56 each produce an output "1" and an AND circuit 57 consequently produces an output "1".

Since the outputs of AND circuit 57 and a timer circuit (or delay circuit) 58 are fed to an AND circuit 59, the AND circuit 59 produces an output "1" when the abnormal state of the pertinent triport UPS continues beyond the prescribed duration. The output constitutes a release signal F for opening the switch 25 to release UPS 1 from further parallel operation.

Figure 4:
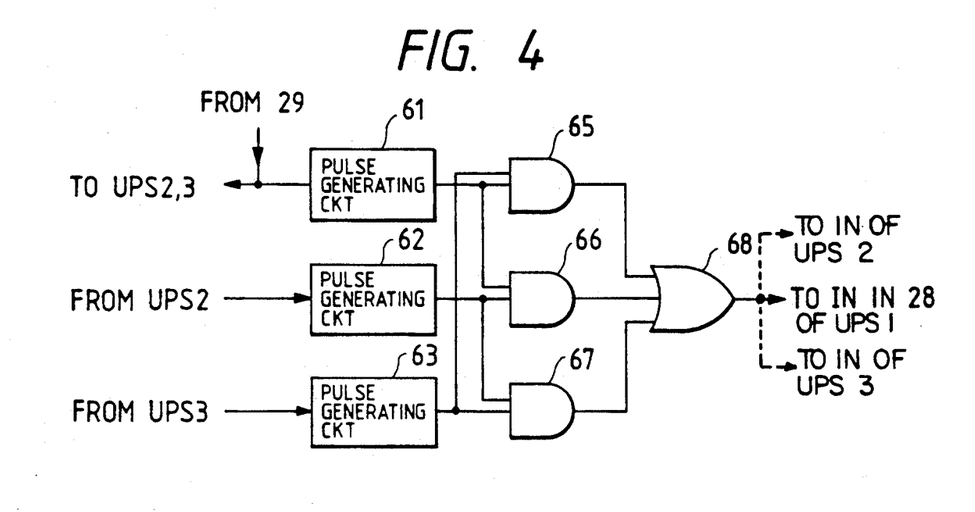
FIG. 4 is a block diagram illustrating a specific configuration of a parallel synchronizing signal generating circuit.

FIG. 4 is a block diagram illustrating a specific configuration of the parallel synchronizing signal generating circuit 41.

A pulse generating circuit (such as, for example, a one-shot multivibrator) 61 is supplied a rectangular wave output from the oscillating circuit 29 and generates a trigger pulse synchronized to the leading edge of the corresponding rectangular wave. Other pulse generating circuits 62 and 63 are similarly supplied the rectangular wave outputs from the oscillating circuits (not shown) of the other two triport UPS's 2 and 3 to generate a trigger pulse synchronized to the leading edge of each of the rectangular waves.

The trigger pulses are paired and fed into AND circuits 65 to 67. In the present embodiment, therefore, any of the AND circuits 65 to 67 produces an output when the phases of the rectangular waves fed out of the oscillating circuits of the corresponding two of the three triport UPS's 1, 2 and 3 coincide with each other.

The pulses fed out of the AND circuits 65 to 67 are applied through an OR circuit 68 to the IN (inverter) terminal of the changeover switch 28 and serve as trigger pulses for the oscillating circuit 29 common to all of the triport UPS's 1,2 and 3 in parallel operation with one another while the operation is proceeding in the inverter mode.

In the manner described above, the synchronization between the inverters of the triport UPS's 1, 2 and 3 in parallel operation with one another is secured.

In the configuration of FIG. 4, a logical multiplier, or AND gate, may not be normally operated due to the phase deviation mentioned above when the trigger pulses fed out of pulse generating circuits 61 to 63 happen to have an unduly short duration (less than the level of about 6 to 10 μs, for example). Desirably, this trouble is corrected by setting the output pulse duration of the pulse generating circuits 61 to 63 in advance to a suitably long value (200 μs, for example), driving an additional pulse generator (not shown) to produce trigger pulses with narrower width in response to the output pulses from the OR circuit 68, and feeding the trigger pulses with narrower width to the IN terminal of the changeover switch 28.

Figure 5:
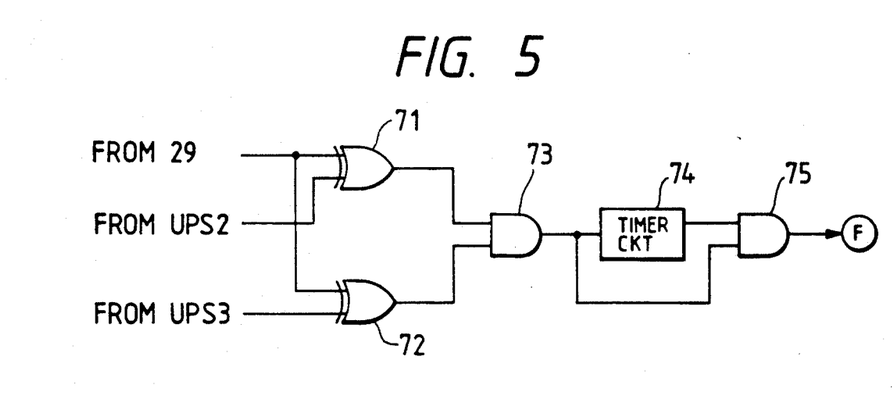
FIG. 5 is a block diagram illustrating a specific configuration of a synchronization monitoring circuit.

FIG. 5 is a block diagram illustrating a specific configuration of synchronization monitoring circuit 43.

The rectangular wave outputs from the oscillating circuits 29 of the pertinent triport, UPS 1, and the other triport UPS's 2 and 3 in parallel operation together are paired and fed to two-input exclusive OR circuits 71 and 72. The exclusive OR circuits 71 and 72 produce no output and consequently the synchronization monitoring circuit 43 produces no output while the phase of the output from the oscillating circuit 29 of the pertinent triport, UPS 1, coincides with that of the outputs from the oscillating circuits of the other two triport UPS's 2 and 3.

When the phase of the output from the oscillating circuit 29 of triport UPS 1 deviates from that of the outputs from the oscillating circuits of the other two triport UPS's 2 and 3, the outputs of the pair of exclusive OR circuits 71 and 72 are "1's" and, therefore, an AND circuit 73 produces "1" as an output.

The output "1" from the AND circuit 73, as in the operation mode monitoring circuit shown in FIG. 3, is applied to a timer circuit (or delay circuit) 74 and both the outputs from the AND circuit 73 and the timer circuit 74 are fed to an AND circuit 75.

As a result, the AND circuit 75 produces an output when the state in which the output of the oscillating circuit 29 deviates from that of the other triport UPS's 2 and 3 continues beyond the prescribed duration, and said output is used as a parallel release signal F for opening switch 25.

Generally, the exclusive logical operation for the monitoring of synchronization during the parallel operation of plural triport UPS's can be suitably set for each in accordance with the idea described above. Since the possibility of a plurality of triport UPS's simultaneously developing a deviation of phase is very low, however, it is practically sufficient to monitor the synchronization between the one particular triport UPS, as an object of monitoring, and each of the remaining triport UPS's.

Now, the operation of the embodiment of this invention as so far described will be explained below.

The starting of the component triport UPS 1 of the parallel operation system according to the invention is attained by the conventional sequence control for starting as described below.

When the commercial and DC power source breakers (not shown) on the input sides of the triport UPS 1 are off, the line switch 23, the inverter switch 24, and the output parallel connection switch 25 are invariably off, and the inverter 26 is at rest, but the power source for the control circuit of the triport UPS 1 is turned on. Consequently, the oscillating circuit 29 is triggered by an internal reset signal and begins to oscillate at a frequency substantially equal to the commercial power source frequency.

The inverter 26 is started by closing the breaker of the DC power source on the input side of the UPS 1. Since the inverter switch 24 is simultaneously turned on, the triport transformer 22 is excited.

When the breaker of the commercial power source on the input side of the UPS is closed, the oscillating frequency of the oscillating circuit 29 is lowered to a value slightly lower than the rated frequency of the commercial power source. When the phase of the rectangular wave from the output of oscillating circuit 29 coincides with that of the AC input, the oscillating circuit 29 begins to be controlled by the zero cross signals from the AC input synchronizing signal generating circuit 27 and starts generating rectangular waves perfectly synchronized with the AC input.

After the synchronization of the inverter 26 and the input commercial power source is confirmed in the manner described above, the line switch 23 is turned on under the condition that the inverter monitoring circuit 32 has detected that the inverter 26 is normally operating.

At the same time, the mode controlling circuit 39 controls the phase shifter 30 to delay the phase of the rectangular waves produced by the oscillating circuits 29 so that the current detected by the inverter current detector 37 is zero, namely the inverter 26 is prevented from bearing the load current. As the result, the triport UPS 1 starts operating in the normal mode.

The other triport UPS's 2 and 3 are started and set operating in the normal mode as described above. Since the times required for starting the individual triport UPS's are not uniform, the parallel operation of these triport UPS's necessitate the following particular control sequence for their start.

In the configuration illustrated in FIG. 1, for example, when it is first confirmed that the triport UPS's 1 and 2 have assumed the normal mode, the corresponding switches 25 for selecting parallel operation are simultaneously closed to start the parallel operation of these two triport UPS's 1 and 2. Next, when the triport UPS 3 subsequently assumes the normal mode, the parallel operation switch 25 corresponding to the UPS 3 is closed to complete the normal mode parallel operation of the three triport UPS's 1, 2 and 3.

At this time, all of the triport UPS's are perfectly synchronized because the oscillating circuits 29 of all triport UPS's 1, 2 and 3 are driven by the trigger pulses synchronized with the zero cross signal of the single commercial power source which is the common AC input.

In cases where the inverters in the three triport UPS's 1 to 3 under the normal mode parallel operation described above are all normal and the commercial power source 9 serving as the AC input is also normal, the AC input monitoring circuit 34 illustrated in FIG. 2 produces the signal "1" indicative of the normality of the AC input and the changeover switch 28 is connected to the AC terminal as illustrated.

The AC input synchronizing signal generating circuit 27 produces trigger pulses synchronized with the zero crosses of the commercial power source voltage and consequently causes the oscillating circuit 29 to produce rectangular waves of the same phase as the zero crosses of the commercial power source voltage.

The rectangular waves produced by the oscillating circuits in the triport UPS's 1, 2 and 3 have identical phases because the oscillating circuits in the other two triport UPS's 2 and 3 operating in parallel produce the rectangular waves in the same phases as the zero crosses of the commercial power source voltage.

As a result, the pulse generating circuits 61 to 63 of the parallel synchronizing signal generating circuits 41 generate in-phase trigger pulses which are fed to the IN terminal of the changeover switch 28.

As clearly noted from the description given above, the two sets of trigger pulses issued from the AC input synchronizing signal generating circuit 27 and the parallel synchronizing signal generating circuit 41 are perfectly synchronized and in phase with each other.

The outputs of the AND circuits 51 to 53 in the operation mode monitoring circuit 38 are all "1's" because the outputs from the AC input monitoring circuits 34 in all of the triport UPS's 1, 2 and 3 in parallel operation, with one another, namely the inputs to the operation mode monitoring circuits 38, are all identical.

As a result, the mode controlling signal produced from the OR circuit 54 is "1" and the mode controlling circuit 39 closes the line switch 23 and, at the same time, controls the phase shifter 30 to cause the inverter driver 31 to set the inverter 26 in the standby state. To be more specific, the phase of the rectangular waves produced from the oscillating circuits 29 is delayed so that the input current to the inverter 26 is kept at zero and the inverter 26 is prevented from bearing the load current. Control of such kind is well known to persons of ordinary skill in the art. At this time, the inverter switch 24 is kept in the ON state.

In the meantime, the outputs from the two exclusive OR circuits 55, 56 in the circuit 38 are "0's" and the output from the synchronization monitoring circuit 43 is also a "0". It follows that the signal F for directing whether to keep the UPS operating in parallel with the others, and which is the output from both the operation mode monitoring circuit 38 and the synchronization monitoring circuit 43 is in each instance also a "0's", with the result that the switch 25 controlled thereby is retained in the closed state.

The normal mode parallel operation of the triport UPS's 1, 2 and 3 is carried out as described above. While the AC input is normal, since the inverter is held in the standby state (with the input current thereof being zero), substantially all load current is supplied to the load from the commercial power source 9 through the line switch 23 and the triport transformer 22. Further at this time, the storage battery 10 is charged from the commercial power source 9 through the charger 12. Of course, the storage battery 20 may be replaced with some other suitable DC power source.

When the AC input monitoring circuit 34 detects an abnormality during the course of the normal mode parallel operation described above, the exclusive OR circuits 55 and 56 and the AND circuit 57 of the operation mode monitoring circuits 38 generate as outputs "1's" and, after these "1's" have lasted beyond the prescribed duration, the signal F with a parallel operation released indication is issued. As a consequence, the switch 25 making the parallel operation connection is opened and the pertinent triport, UPS 1, is released from the parallel operation with the other triports.

When the inverter 26 develops an abnormality, the inverter monitoring circuit 32, which compares the inverter drive signal and output signal of the inverter 26, issues a signal of abnormality. As a result, the inverter switch 24 and the switch 25 making the parallel operation connection are opened and the triport UPS 1 is released from the parallel operation with the other triports.

The effective power P of the triport UPS is represented by the following formula (1):

$$P = V_0 \cdot V_1 \sin \theta / \omega L \qquad (1)$$

In the formula, V0 stands for the output voltage, V1 for the input voltage, θ for the phase difference between the input and output voltages, L for the leakage inductance of the triport transformer, and ω for the angular frequency.

The effective power of the triport UPS is inversely proportional to the leakage inductance. By making the leakage inductances of the triport UPS's under parallel operation inversely proportional to their output capacities, therefore, the load can be allocated proportionately to the inverter capacities of the triport UPS's operating in parallel without requiring any special load control means.

Once the setup mentioned above is established, even when one of the plurality of triport UPS's operating in parallel with one another develops an abnormality, the parallel operation can be continued with proper allocation of load without employing any special control means (such as, for example, means for readjusting the load allocation).

When the commercial power source 9 fails during the course of the normal mode of parallel operation, the AC input monitoring circuit 34 of the triport UPS 1 issues an AC abnormal signal "0", with the result that the changeover switch 28 is switched from the AC side to the IN side and the oscillating circuit 29 begins to be driven by trigger pulses from the parallel synchronizing signal generating circuit 41.

Since the trigger pulses on the AC side and on the IN side have been controlled so as to possess perfectly identical phases as described above, the phase of the rectangular waves produced by the oscillating circuit 29 is not varied but allowed to maintain continuity.

When the AC abnormal signal "0" is issued, the AND circuits 51 to 53 and the OR circuit 54 in the operation mode monitoring circuit 38 produce outputs of "0's" and the mode controlling circuit 39 opens the line switch 23 and, at the same time, switches the inverter 26 from the standby mode to the operation mode or the inverter mode.

Specifically, the phase shifter 30 is controlled so as to nullify the phase delays of the rectangular waves produced by the oscillating circuits 29, in other words, to equalize the phase of the rectangular waves to that of the commercial power source 9 prior to the occurrence of the abnormality. The inverter 26 is thereby caused to feed a load current equal to that which had been borne by the AC input commercial power source prior to the occurrence of the abnormality. The control of such kind is well known to persons of ordinary skill in the art.

In the meantime, the outputs from the exclusive OR circuits 55 and 56 and the AND circuits 57 and 59 of the operation mode monitoring circuit 38 are all unaltered and the output from the synchronization monitoring circuit 43 is not altered. Thus, no action directed toward opening the switch 25 is carried out so that operation in parallel continues.

When the abnormality occurs in the AC input as described above, all of the triport UPS's 1 to 3 are simultaneously switched from the standby mode to the inverter mode to establish the state of inverter mode parallel operation.

The switching to the inverter mode of parallel operation in response to the abnormality in the AC input is attained substantially instantaneously on all of the parallel operating triport UPS's because the detection of abnormality in the AC input is carried out early and quickly. Thus there is no need to consider the allocation of the load upon the triport UPS's during the course of the switching.

When the AC input is restored and the normal mode of parallel operation is resumed during the course of the inverter mode of parallel operation, then, since the discernment of the restoration of the normality of the AC input calls for a relatively long time and the time required for said discernment often varies between the triport UPS's, there is the possibility of the allocation of load among the triport UPS's losing balance.

Figure 6:
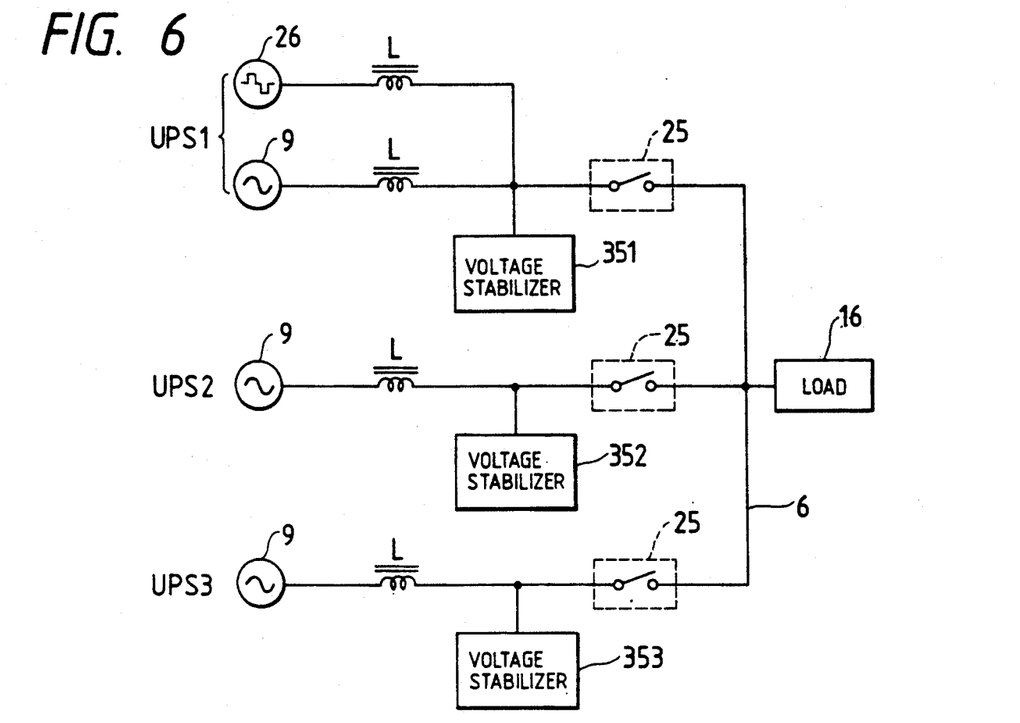
FIG. 6 is an equivalent circuit diagram to explain the operation when a power source connected in parallel at its output according to the present invention is switched from the inverter mode to the normal mode.

The possibility mentioned above will be described below with reference to FIG. 6. FIG. 6 represents an equivalent circuit of the parallel operation power source shown in FIG. 1 at the time when, in the triport UPS 1, the line switch 23 is turned on and the inverter 26 has not yet assumed the standby state and the output thereof is in phase with the commercial power source, while the triport UPS's 2 and 3 have been already shifted to the normal mode (with the corresponding inverters in the standby state).

For the sake of simplicity in the explanation, it is assumed that all of the triport UPS's 1 to 3 possess equal capacities and, consequently, the leakage inductances formed by the magnetic shunts 22d, 22e of the triport transformers 22 are set at equal magnitude L. On said assumption, the internal impedance of the triport UPS 1 is one half that of the triport UPS's 2 or 3.

Since the load borne by each of the triport UPS's is inversely proportional to the magnitude of the leakage inductance thereof as described above, the triport UPS 1 is destined to bear twice as much power as the other triport UPS's 2 or 3. Thus, there ensues the disadvantage that the allocation of load ceases to be proportional to the capacities of the triport UPS's.

Moreover, since the voltage stabilizer 351 of the triport UPS 1 suffers from an unduly increased burden, the voltage stabilizers 352 and 353 of the other triport UPS's 2 and 3 function to assist the voltage stabilizer 351 under the heavy load and consequently induce flow of a reactive current between the triport UPS's 1, 2 and 3. The reactive current not only causes a loss in the power source devices operating in parallel but also jeopardizes the stability of the system.

The operation mode monitoring circuit 38 of the present invention serves to preclude the disadvantageous phenomenon described above. To be specific, the AND circuits 51 to 53 and the OR circuit 54 in the operation mode monitoring circuit 38 issue a mode control signal when the prescribed number in all of the triport UPS's under parallel operation are switched from the inverter mode to the normal mode. Thus, all of the triport UPS's in parallel operation are simultaneously shifted to the normal mode by the same timing.

In the embodiment described above, the triport transformer 22 have been described as being provided with magnetic shunts and causing the leakage inductance produced thereby to be utilized as the DC inductance. Optionally, the triport transformers 22 may be provided with external reactance elements.

The operation mode monitoring circuits 38 and the parallel synchronizing signal generating circuits 41 have been described as being installed one each in each of the individual triport UPS's. Optionally, a single operation mode monitoring circuit and a single parallel synchronizing signal generating circuit may be disposed so as to be commonly used by all of the triport UPS's in parallel operation with each other as indicated by the added dashed line signal paths extending from gate 54 in FIG. 3, and from gate 68 in FIG. 4.

In the embodiment of FIG. 2, the magnetic core of the transformer 22 is described as being divided by the pair of magnetic shunts 22d, 22e into three sections, with the output winding 22c formed in the central section. When the output winding is formed in a terminal section, as disclosed in U.S. Pat. No. 4,556,802 which has been assigned to the present assignee, for example, the control of the shift of the triport UPS between the normal mode and the inverter mode can be carried out simply and accurately.

The preceding embodiments have been described as using independent transformers for each of three phases. Optionally, the magnetic cores thereof may be formed in the shape of a triangular prism (or a delta-form) as disclosed in the specification of U.S. patent application Ser. No. 213,257, now U.S. Pat. No. 4,862,059, which has been assigned to the present assignee, for example. Specifically, the three triport transformers for three phases are arranged substantially along the edges of a triangular prism in such a manner that the rectangular magnetic cores of any two adjacent transformers will be disposed parallel to each other to form three paired legs. Then a common winding is formed on the three paired legs.

Figure 7:
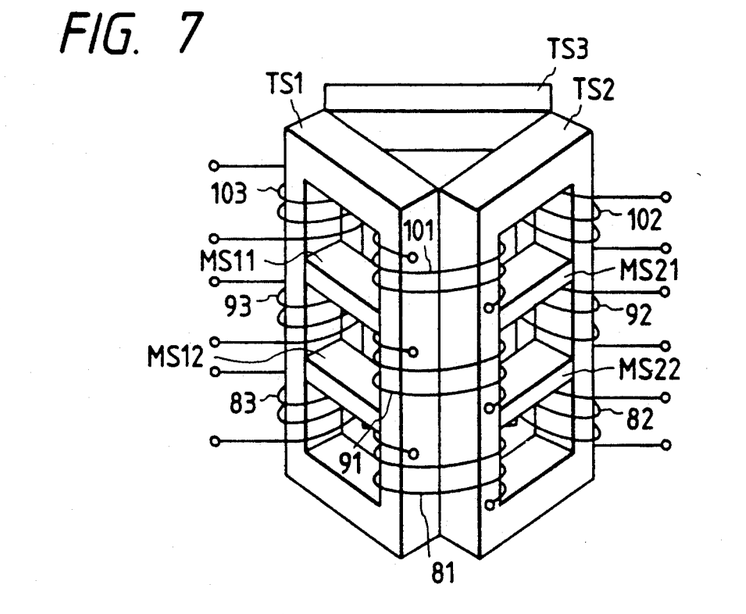
FIG. 7 is a perspective view illustrating in schematic form the transformers adapted to be used in the present invention.

In the configuration of FIG. 7 which is a quotation from the drawings of U.S. patent application Ser. No. 213,257, three triport transformers TS1 to TS3 are each formed of a rectangular frame-shaped iron (or magnetically permeable) core each having a corresponding pair of magnetic shunts MS11 and MS12, MS21 and MS22, or MS31 and MS32 (which are partly hidden in the diagram) to thereby form three winding sections or windows.

These transformers are placed together approximately in the shape of three faces of a triangular prism so that each of the adjacent leg part pairs of two of the three transformers will stand side by side as illustrated in FIG. 7. Common windings are formed on adjacent pairs of legs for each of the three pairs of adjacent legs. Since the iron cores are each divided into three winding sections by pairs of magnetic shunts as described above, the windings are formed with one in each pair of adjacent winding sections for each adjacent pair of cores.

One set of output windings 91 92, and 93 is formed in the corresponding second winding sections at the center of adjacent pairs of cores. Two sets of input windings 101 to 103 and 81 to 83 are formed, respectively, in the corresponding ones of the first adjacent winding sections and in the corresponding ones of the third winding sections in the upper and lower parts of adjacent pairs of cores.

By applying common windings in the manner described above, one winding is allowed to function equivalently as two windings. In said setup, therefore, the number of windings can be reduced to one half that which is required when the windings are formed one each on separated transformers. Further, the phase deviations in the output voltages which occur when the power source or load or both are deprived of equilibrium can be decreased.

As is plain from the description given above, this invention brings about the following effects.

(1) By having the leakage inductances (internal inductances) of the triport UPS's set in advance so as to be inversely proportional to the output capacities of the triport UPS's, the allocations of load current can be proportional to the output capacities of the triport UPS's connected in parallel operation together without requiring any special control means.

(2) During the operation in the inverter mode, any deviation of synchronization between the inverters or a difference in phase between the output voltages is substantially nullified and the circulating current is minimized because the phases of the oscillating circuit trigger pulses in all of the triport UPS's can be kept in phase with each other by the parallel synchronizing signal generating circuit.

(3) The switching between the normal mode and the inverter mode can be effected simultaneously on all of the triport UPS's, based on a proper prescribed logic operation (such as, for example, the rule of decision by majority or the coincidence above a stated level) performed on the mode discriminating signals from the triport UPS's. Thus the unbalance of the allocations of load, the occurrence of the circulating current, the unstability of the system, etc. due to the lack of coincidence in the switching timing can be precluded.

(4) In the release of a particular triport UPS in trouble from the parallel operation, then, since the rate of increase of the short-circuit current in the case of a short circuit, for example, can be suppressed by the leakage inductance (internal inductance) mentioned above, the time allowed for the detection of the short circuit or the release from parallel operation of the UPS in trouble can be lengthened and the structure of the detection and protection means can be simplified to ensure low cost and high reliability of the system.

What is claimed is:

1. An apparatus for the parallel operation of triport uninterruptable power source devices which are adapted to be connected in parallel between an AC input power source and an output terminal so as to be operable in parallel therebetween, said apparatus comprising:
   a plurality of triport uninterruptable power source devices each comprising:
      a three-winding transformer having a first, a second and a third winding;
      an AC input suited for connection to an AC input power source and connected to the first winding of the transformer through a first inductive component;
      an inverter connected to the second winding of the transformer through a second inductive component;
      an output terminal connected to the third winding of the transformer through a parallelization switch;
      means for driving the inverter in synchronization with the voltage waveform of the AC input power source if connected to the AC input including an oscillating circuit adapted to be selectively triggered by pulses corresponding to the zero crossing points of the AC input power source voltage waveform so that such pulse triggering thereof results in an oscillating circuit output waveform with a corresponding phase, a phase shifter for providing phase shifting of the output waveform produced by the oscillating circuit, and an inverter driver for supplying the inverter with the output of the phase shifter;
      an AC input monitoring circuit for detecting AC input power source voltage waveform abnormality if present on the AC input and providing an output signal indicating whether such an abnormality has occurred;

a mode controlling means for executing a logic operation on the output signal of the AC input monitoring circuit to switch the operation mode of the inverter between a standby mode, absent any abnormality being detected by the AC input monitoring circuit in which mode substantially no output current is generated by the inverter, and an inverter mode, upon the occurrence of an abnormality being detected in the AC input monitoring circuit in which mode an output current is generated by the inverter; and a synchronization monitoring means for comparing phases of the output waveforms of the oscillating circuits in the plurality of triport uninterruptable power source devices such that, if any differences between the phase of the output from the oscillating circuit of one of the triport uninterruptable power source devices and the phases of the outputs from the oscillating circuits of the remaining ones of the plurality of triport uninterruptable power source devices exceeds a selected level, the synchronizing monitoring means for that triport uninterruptable power source device provides a parallel operation release signal to open the parallelization switch thereof.

2. An apparatus according to claim 1, wherein at least one of the first and second inductive component is a leakage inductance generated by the magnetic shunt formed on a magnetically permeable core of the three-winding transformer.

3. An apparatus according to claim 1, wherein at least one of the first and second inductive component is an inductor connected in series to the corresponding input winding of the three-winding transformer.

4. An apparatus according to claim 1, wherein the magnitudes of the first and second inductive components of each of the triport uninterruptable power source devices are set so as to be inversely proportional to the respective output capacities.

5. An apparatus according to claim 1, wherein the magnetically permeable core of the three-winding transformer is divided with two magnetic shunts into three sections including one central and two terminal sections and the third winding is formed on one terminal section and the first and the second windings are formed in the remaining two sections.

6. An apparatus according to claim 1, wherein the output terminal has a voltage stabilizer connected thereto.

7. An apparatus according to claim 1, wherein the triport uninterruptable power source device is for the three-phase configuration and the three transformers are arranged substantially along the edges of a triangular prism in such a manner that the rectangular magnetically permeable cores of any two adjacent transformers will be disposed parallelly to each other to form three paired legs and a common winding is formed on each of the paired legs.

8. The apparatus according to claim 1 wherein at least one of the plurality of input uninterruptable power source devices further comprises an operation mode monitoring means for performing a logic operation on the output signals of the AC input monitoring circuits of the plurality of triport uninterruptable power source devices and providing a result of the logic operation as a mode controlling signal to the mode controlling means of each of the plurality of triport uninterruptable power source devices.

9. The apparatus according to claim 1, wherein at least one of the plurality of triport uninterruptable power source devices further comprises a parallel synchronizing signal generating means for executing a logic operation on the output waveforms of the oscillating circuits of the plurality of triport uninterruptable power source devices and, on detection of an abnormality by the corresponding AC input monitoring circuits, providing the results of the logic operation as trigger pulses to the oscillating circuits of each of the plurality of triport uninterruptable power source devices.

10. The apparatus according to claim 1 wherein each of said plurality of triport uninterruptable power sources has therein an operation mode monitoring means and a parallel synchronizing signal generating means, and with the operation mode monitoring means performing a logic operation on output signals of the AC input monitoring circuits of the plurality of triport uninterruptable power source devices and providing a result of the logic operation as a mode controlling signal to the mode controlling means of the triport uninterruptable power source device corresponding thereto, and with the parallel synchronizing signal generating means performing a logic operation on the output waveforms of the oscillating circuits of the plurality triport uninterruptable power sources and, on detection of an abnormality by the corresponding AC input monitoring circuit, providing the results of the logic operation as trigger pulses to the oscillating circuit of the triport uninterruptable power source device corresponding thereto.

11. The apparatus according to claim 8, wherein the operation mode monitoring means further uses a result of the logic operation therein to provide a parallel operation release signal to open the parallelization switch for that triport uninterruptable power source device corresponding thereto if the output signal from the corresponding AC input monitoring circuit differs from the output signals from the AC input monitoring circuits of the remaining ones of the plurality of triport uninterruptable power source devices.

* * * * *